(12) United States Patent
Reiner et al.

(10) Patent No.: US 8,279,416 B2
(45) Date of Patent: Oct. 2, 2012

(54) OPTOELECTRONIC SENSOR

(75) Inventors: Gernot Reiner, Gundelfingen (DE);
Gottfried Hug, Waldkirch (DE)

(73) Assignee: Sick AG, Waldkirch (DE)

( * ) Notice: Subject to any disclaimer, the term of this patent is extended or adjusted under 35 U.S.C. 154(b) by 323 days.

(21) Appl. No.: 12/591,431

(22) Filed: Nov. 19, 2009

(65) Prior Publication Data
US 2010/0123895 A1 May 20, 2010

(30) Foreign Application Priority Data
Nov. 20, 2008 (EP) .................... 08105830

(51) Int. Cl.
*G01C 3/08* (2006.01)
(52) U.S. Cl. .............. 356/5.01; 356/5.1; 356/5.15
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS
5,359,404 A * 10/1994 Dunne .................. 356/5.06
5,790,244 A * 8/1998 Dunne .................. 356/5.01
2002/0075919 A1 * 6/2002 Tochio ................. 372/38.02
2007/0206174 A1 * 9/2007 Boegel et al. ............. 356/4.01
2008/0159349 A1 * 7/2008 Kaji et al. .............. 372/38.02

FOREIGN PATENT DOCUMENTS
EP 1 211 762 A1 6/2002
EP 1 298 449 A2 4/2003
JP 61080922 4/1986

OTHER PUBLICATIONS

Bauwelinck, J., et al. "A High-Resolution Burst-Mode Laser Transmitter with Fast and Accurate Level Monitoring for 1.25 Gb/s Upstream GPONs", *IEEE Journal of Solid-State Circuits*, vol. 40, No. 6, pp. 1322-1330, (Jun. 2005).

* cited by examiner

*Primary Examiner* — Luke Ratcliffe
(74) *Attorney, Agent, or Firm* — The Nath Law Group; Jerald L. Meyer; Robert T. Burns

(57) ABSTRACT

An optoelectronic sensor (10) having a light transmitter (12) for the transmitting of laser pulses (18) into a monitored region (24) by means of a laser light source (14) and having a driver circuit (16, 30) for the laser light source (14) is described which is designed to set the light transmitter (12) into a working state in which the laser light source (14) transmits a laser pulse (18) or into a preparatory state. The driver circuit (16, 30) is further designed to set the light transmitter (12) into the preparatory state in each case prior to the transmission of a laser pulse (18).

13 Claims, 3 Drawing Sheets

OPTOELECTRONIC SENSOR

Figure 1:
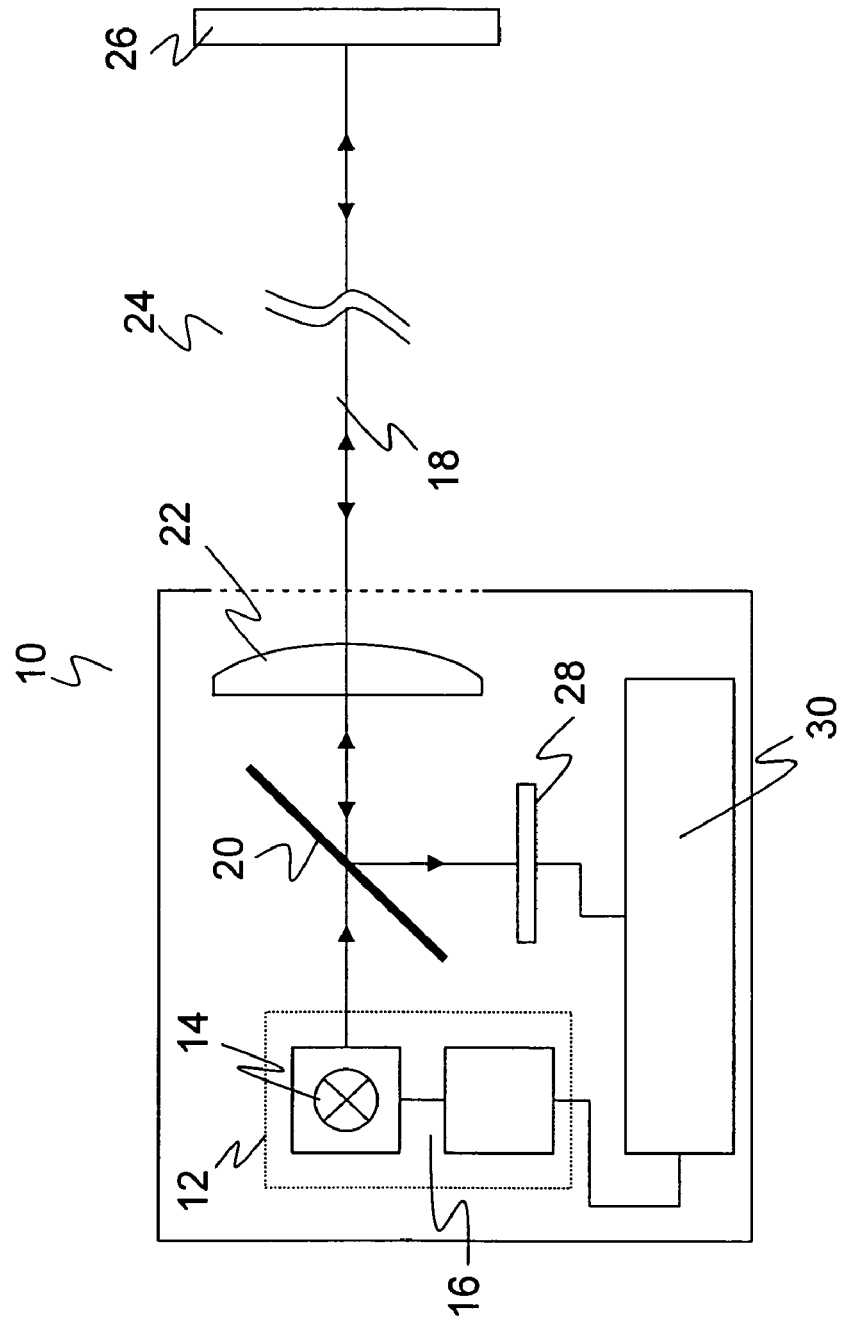

The claimed subject matter relates to an optoelectronic sensor and to a method for the operation of a light transmitter in an optoelectronic sensor in accordance with the exemplary embodiments disclosed herein.

The range of objects can be determined with optoelectronic sensors in accordance with the principle of the light transit time method. For this a short light pulse is transmitted in a pulse transit time method and the time up to the reception or remission or reflexion of the light pulse is measured. Alternatively, in a phase method transmitted light is amplitude-modulated and a phase shift is determined between the transmitted light and the received light.

The range-measurement can for example be required for vehicle safety, for the automation of logistics or of factories or for safety technology. In particular a range-measuring device which is based on a reflected light beam can react to a change in range of the reflector or of the reflecting or remitting target. A particular application is a reflection light barrier in which the spatial region and the distance between the light transmitter and reflector is monitored. Another application is in range-measuring laser scanners, the moving beam of which takes measurements of a line or indeed a surface.

If the resolution of the range measurement is to have an accuracy in the region of a few tens of millimeters then the light transit time must be determined accurately in an order of magnitude of a hundred picoseconds. In order to achieve a distance resolution of one millimeter it must be technically possible to measure six picoseconds.

With such demands on the temporal precision even a small time deviation between the time at which the command for the transmission of the light pulse is given and the actual transmission is a problem. Laser light sources do not however emit light immediately on the application of an electric signal. The charge carrier density is not sufficient for this in a range below a minimum current termed the lasing threshold. Even on application of a current above the lasing threshold a certain run-up time is required in order to form sufficient charge carriers and this leads to a time offset between the electrical input signal at the laser and its optical output signal.

In order to avoid this, the laser is usually biased to a level above the lasing threshold both in the pulse transit time method and in the phase method. In this connection the laser always emits a certain quantity of light even when no light pulse is to be transmitted. In order to keep this permanent streak light power low, the bias current must be kept just above the lasing threshold.

Thus such systems have a series of disadvantages. Any form of output light, even if it is kept low, cuts into the available gap to the actual transmitter powers. This not only reduces the measurement accuracy by reduced exploitable signal spacings (levels) but rather also possibly impairs the protective class of the laser since, in accordance with relevant safety provisions for the protection of the eyes, the average optical output power must remain under a permitted maximum value and light arising as a result of the bias current already claims its share of this.

In order to keep the bias current just above the lasing threshold, an optical feedback for a regulating circuit is required. For this purpose a monitor diode is provided for the laser diode. The required bias current is then always adapted in order to maintain a constant optical output power despite aging effects or temperature effects which shift the lasing threshold.

Moreover, especially with short switch-on durations, that is with time-wise relative thinly spread short pulses, and with large pulse currents the described regulating system reacts particularly sensitively to fluctuations and this possibly leads to unstable behaviour of the laser diode.

Outside of the field of optoelectronic sensors, in the area of optical networks, it is known from the work of D. Verhulst et al. "Theoretical and experimental study of laser turn-on delay in a GigaPON system with pre-biasing bits" to bias the respective laser for time multiplex process only in the time slot associated with it. Within an allotted time slot the method is however completely analogous to the above-described method and also no light pulses are emitted but rather a specific burst determined by the bit pattern which is to be transmitted, which more closely corresponds to a modulated permanent signal than to a pulse.

It is the object of the exemplary embodiments disclosed herein to achieve a highly precise response of a laser in an optoelectronic sensor time-wise in a simple manner.

This object is satisfied by an optoelectronic sensor and by a method for operating a light transmitter in an optoelectronic sensor in accordance with the exemplary embodiments disclosed herein.

In this connection the invention starts from the principle of not continually adopting the preparatory state but rather only in a tight time interval around each transmitted pulse. The laser is energized with a pre-pulse shortly before the actual laser pulse which drives the laser in preparatory manner into the vicinity of the lasing threshold in order to avoid a delay prior to the emission of light or at least to keep it very small.

The solution in accordance with the invention has the advantage that the time of transmission of the pulse coincides sufficiently accurately with the electronic trigger in order to also enable laser light transit time measurements with a time precision below one nanosecond. Non-linearities in the relationship between the electrical input signal and the optical output signal can be compensated by the invention. Such non-linearities can occur to a particular degree with laser diodes in the visible range, even though the invention can also be used in other frequency ranges such as in the infrared.

The permanent light, which is both disturbing for the measurement and a matter of concern from the point of view of regulations relating to eye protection, is avoided as a result in a biasing of the laser since the laser does not emit any light outside of the preparatory state. The laser heats up less and this leads to a longer working life and assists in avoiding aging and temperature effects which in turn shift the lasing threshold. A monitoring diode is not required so that more cost-favourable systems are made possible.

These advantages are of particularly notable effect when the switch-on durations are small, for example when the laser is active in an operation with comparatively rare short pulses for less than 1% of the time and also at high pulse currents approximately above twice the lasing threshold.

The driver circuit is preferably designed to bias the laser light source into the preparatory state, for example to supply a bias current to the laser light source. Thus the laser light source is already energized with the signal prior to the actual pulse. The amplitude for the biasing and the bias current is however selected to be smaller, namely approximately in the region of the lasing threshold.

A control unit is advantageously provided which is designed to preset characteristics of the laser pulse and/or of the preparatory state for the driver circuit, in particular the time behaviour and/or the amplitude behaviour. Features of the driver circuit can always be associated with the control unit and vice versa. The time characteristics of individual pulses are referred to collectively under the term "time behaviour", such as the start, the duration and end of the pulses but also the pattern as to how the pulses are distributed over a longer time interval. In the simplest case the period between two pulses, i.e. approximately one pulse per microsecond is sufficient for this, however any desired complicated patterns are conceivable. Conceivable amplitude behaviour is the presetting of a maximum amplitude that is aimed at up to a function of the amplitude over the pulse duration, i.e. a complete pulse shape. Since the energizing into the preparatory state can take place in the form of a pre-pulse, the named characteristics apply, depending on the embodiment, both in the preparatory state and also to the working state.

The driver circuit is preferably designed to place the light transmitter with a brief time lead into the preparatory state which corresponds in particular approximately to one to five time the duration of the laser pulse. This is related to the pulse width because possible delays must be expected approximately in this order of magnitude. The typical pulse width lies at a few nanoseconds, for example 5 ns, so that a time lead of 5 to 25 ns or preferably 10 to 15 ns is selected. What is sought is a reasonable compromise between the shortest possible duration of the preparatory state and the certainty that within this duration a charge carrier density is reached which is aimed at and thus a desired gap to the lasing threshold is actually achieved.

The driver circuit is furthermore preferably designed to terminate the preparatory state for the light transmitter at the earliest at the end of the laser pulse and then quickly, in particular at the latest after one to five times the duration of the laser pulse. The statement that is made in the preceding paragraph applies in analogous manner here to the orders of magnitude time-wise. The preparatory state should be completely super-imposed on the working stage because with an earlier end of the preparatory state energy would be lacking in the light pulse. Naturally it is conceivable to terminate the pre-pulse at the time of triggering of the laser at the start of the transmitted laser pulse and to compensate for the missing energy by stronger excitation during the working state. However for this, an accurate matching time-wise is required. A certain duration of the preparatory state beyond the working state is less critical and here, in similar manner to the lead time, the quickest possible switching off is aimed at. A reference quantity for the time lead and the termination of the preparatory state which is an alternative to the pulse duration of for example 5 ns is the working life of the charge carriers which are generated by the biasing or by the bias current and which typically lies in the order of magnitude of 10 ns.

In an advantageous further development the driver circuit is designed to place the laser light source in the preparatory state prior to the start of the laser pulse close to the lasing threshold but not however to exceed it, in particular to place the laser light source to 70% to 90% of the lasing threshold. The biasing or the bias current thus remains strictly below the threshold so that the laser light source only emits light during the transmitted light pulse. Only the working state is the determining factor for the eye protection since light is only transmitted at all then. The lasing threshold lies for example in the order of magnitude of 50 mA, which is also dependent on environmental conditions and on the operating temperature. The pulse height during the working state has a considerable level, it amounts preferably to two to eight times the lasing threshold and even more preferably to 200 to 300 mA.

In a particularly preferred embodiment a temperature sensor is provided in order to determine the operating temperature of the laser light source, with the driver circuit being designed to select the amplitude in the preparatory state in temperature dependent manner with reference to a table or to computing rule. Two temperature sensors which monitor each other are conceivable instead of one single one. The lasing threshold is a temperature dependent parameter. If a table or a computing rule is stored in the driving circuit or in the control which contains the required lasing threshold at a given temperature, then the lasing threshold or the fraction of the lasing threshold that is aimed at can be read out and can be subsequently corrected in dependence on the temperature. Thus the sensor is stable temperature-wise and delays between the trigger point of the laser that is aimed at and that actually achieved are avoided even with a fluctuating external temperature or operating temperature. The deposited amplitude is the relevant parameter for the laser triggering during the preparatory state, i.e. for example the amplitude of the bias or of the bias current.

As an alternative to a table or to a computing rule, the entire characteristic field plot of the laser can be stored with temperature-dependent lasing thresholds, i.e. the optical output power in dependence on the laser current for different temperatures. On the basis of this characteristic field plot the actual laser pulse during the working state can be subjected to follow up control during the working state, indeed beyond the lasing threshold, so that it retains the same shape and maximum amplitude independently of the temperature.

The driver circuit is preferably designed to keep the laser light source free of current outside of the working state and of the preparatory state and/or to achieve the working state only via the preparatory state. Considerations regarding eye protection regulations are then only to be related to the working state, because otherwise the laser light source cannot be optically active. By switching the laser light source so that it is current-free outside of the preparatory state, i.e. completely switched off, its long working life can be increased and the operation temperature can be kept more stable.

The sensor is preferably designed as a range-measuring system and has in particular a light receiver for the reception of light pulses and also an evaluation unit which is designed to calculate a range by means of a transit time method from a pulse transit time between the transmission and the reception of a light pulse. Such systems are dependent to a particular degree on precise time behaviour. In this connection both absolute range measurement devices are conceivable, i.e. those which numerically determine the range of an object, and also monitoring range measurement devices which are directed to a target object and determine whether and to what degree the spacing to this target object changes.

In a preferred further development the sensor is designed as a range-measuring laser scanner and has in particular in addition a deflection unit in order to sweep light pulses which are transmitted one after the other over a monitored region. In this connection the pulses are thus guided by the deflection unit over a line or an area so that the recording of a range card is made possible. Elements known per se such as a rotary mirror or a polygonal wheel mirror, serve as a deflection unit. Laser scanners frequently use higher pulse powers in the range up to a few Watts and smaller scanning rates, such as for example 25 to 40 kHz, in order to be correct for the deviating demands for typical applications.

The method of the invention can be designed in similar manner through further features and achieves in this connection similar advantages. Such further features are described by way of example, but not exhaustively, in the subordinate claims which follow the independent claims.

Figure 2:
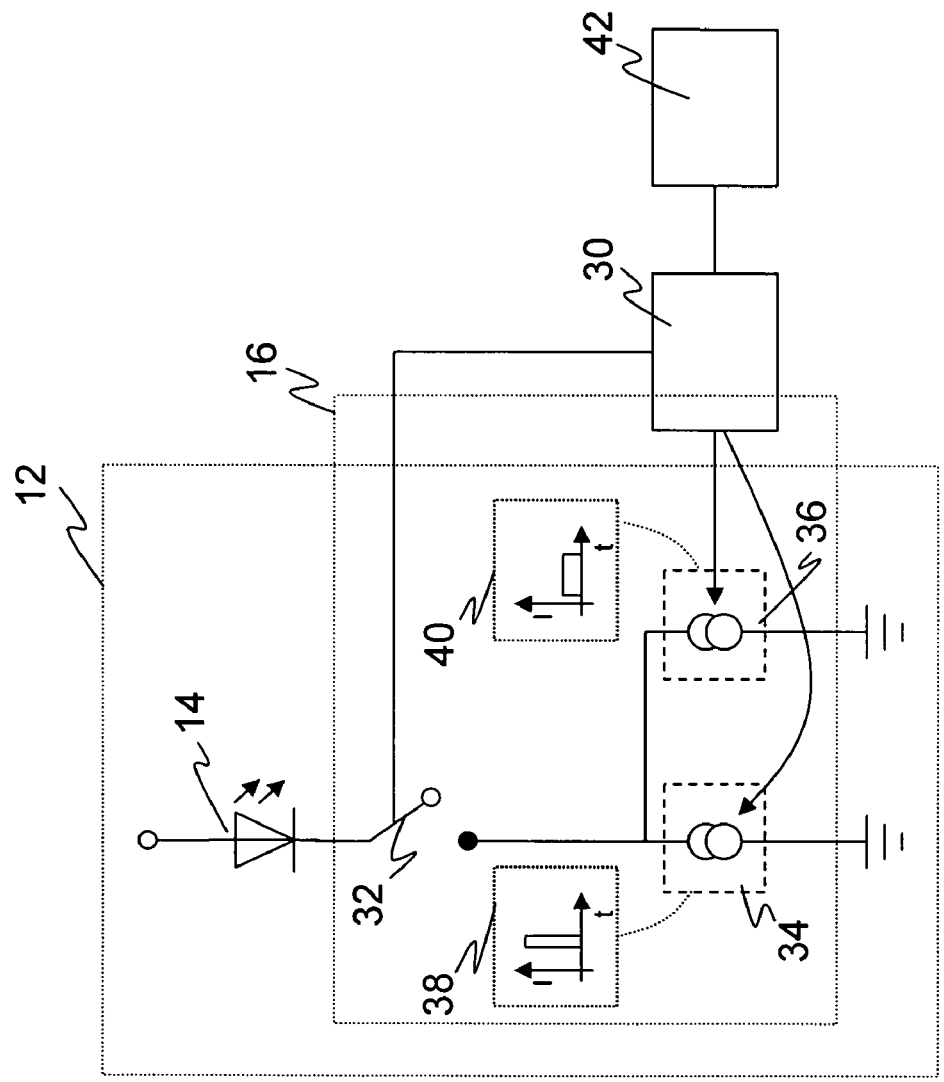
Figure 3:
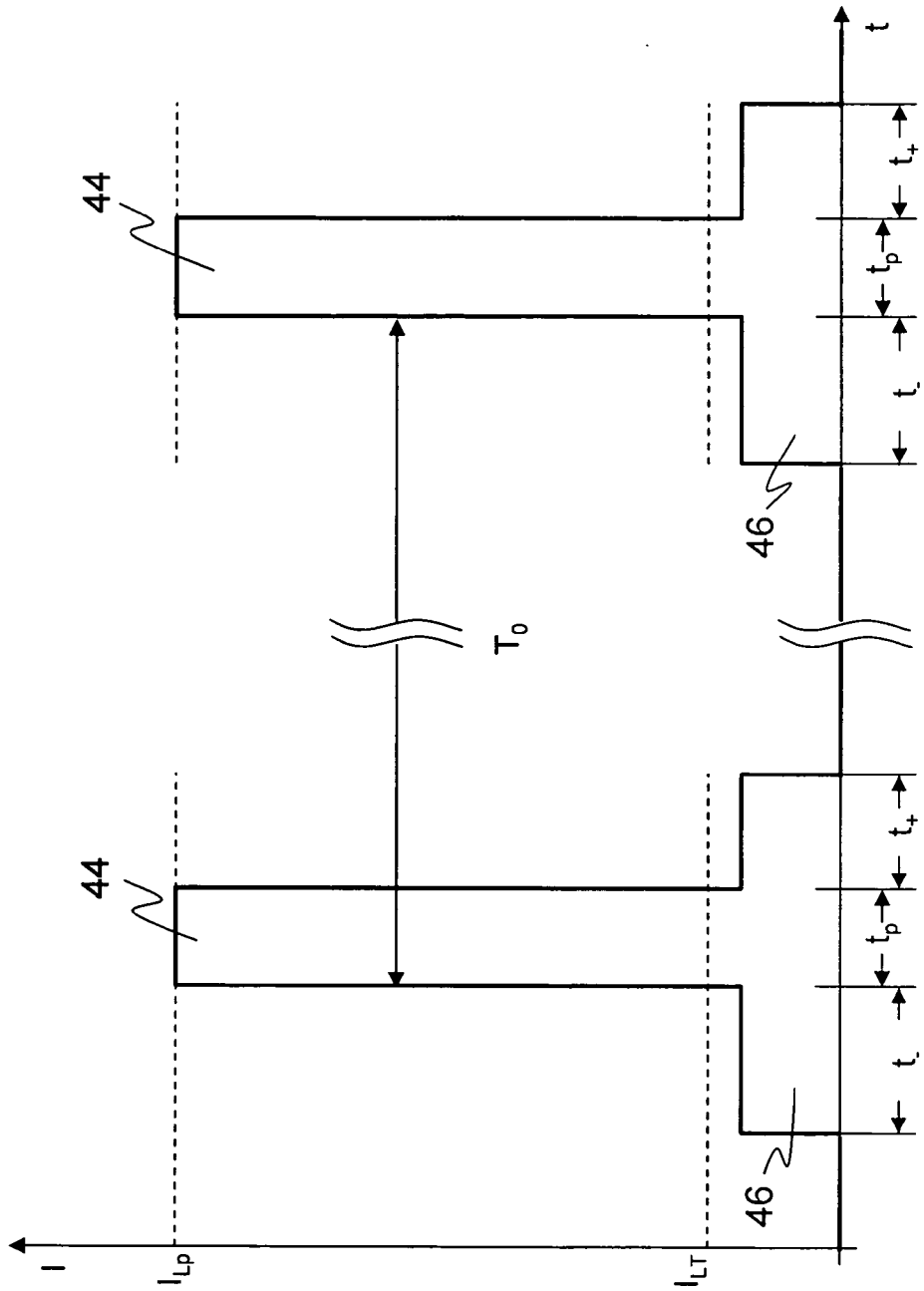

The invention will be explained in the following also with respect to further advantages and features and with reference to the accompanying drawings and to embodiments. The Figures of the drawings show:

FIG. 1 a schematic block representation of an embodiment of a sensor in accordance with the invention;

FIG. 2 a schematic block representation of an exemplary driver circuit for a light transmitter and FIG. 3 an illustration of the time behaviour and amplitude behaviour in a time interval around the transmission time point of a laser pulse in the form of a diagram of the laser current as a function of time.

FIG. 1 shows a schematic block representation of an optoelectronic sensor 10 in accordance with the invention. A light sensor 12 having a laser light source 14 and a driver circuit 16 for the laser light source 14 generates light pulses 18. The light pulse 18 usually has a simple shape, for example a parabolic shape or a Gaussian curve, can however also have too more complicated signal shapes.

The light pulses 18 are transmitted through a divider mirror 20 with the reflected light component being lost and being absorbed to avoid optical cross-talk. Through an optical system 22, for example a collecting lens, the light pulses 18 are transmitted into a monitored region 24 and are there reflected or remitted at objects 26.

The so arising returning light pulses 18 meet the divider mirror 20 again via the optical system or lens 22 and the light component which is reflected there is converted into an electrical signal in a light receiver 28. The light receiver 28 is not restricted to a specific technology. Customarily a simple photodiode is used. However, in principle the use of a PSD (position sensitive diode) or a row or matrix of light receiver elements is also conceivable such as a CCD chip or a CMOS chip.

A control circuit 30 is connected both to the light transmitter 12 and also to the light transceiver 28 and determines the light transit time between the transmission and the reception of the light pulses 18 and from this the range to objects 16 via the speed of light. The control circuit 30 can be of analog design, is however preferably implemented on one or more digitally programmable components, for example DPSs (Digital Signal Processor), FPGAs (Field Programmable Gate Arrays), ASICs (Application Specific Integrated Circuits) or microprocessors. The driver circuit 16 which is explained in more detail in FIG. 2 is preferably of analog design can however also be digitally triggered by the control circuit 30.

The autocollimation construction with the beam divider 20 shown in FIG. 1 is only to be understood as an example for a sensor 10 in accordance with the invention. Other basic constructions are also known, for example those, in which the light transmitter is surrounded by a light receiver which is larger area-wise and thus returning light having a lost component, which is determined by the area of the light transmitter, falls onto the light receiver without beam deflection. Another example is the principle of pupil division in which two separate optical systems are provided and the light transmitter and light transceiver are arranged alongside one another.

The sensor 10 can be an optoelectronic probe or range measurement device. A further embodiment is a reflection light barrier, i.e. a light barrier with a light transmitter and a reflector arranged opposite to it, with an interruption of the beam reflected there being detected. Through the measurement of the range or of the change of the range or distance of this reflector it can be monitored whether the reflector is still at the expected location. All named sensors can also operate as switches in that a switching event is triggered on detection of an object at a specific range or on deviation from an expected range or distance. Scanning systems are also conceivable in which the transmitted light pulse sweeps by means of a deflection unit along a monitored line or over a monitored surface, in which the deflection unit can be a rotary mirror or a polygonal mirror wheel.

FIG. 2 shows a block circuit diagram of the light transmitter 12 with additional elements which were omitted in FIG. 1 for the sake of better clarity. The laser light source 14 is shown here as a laser diode. Any desired laser light sources 14 can be considered, for example edge emitters or VCELs (Vertical Cavity Surface-Emitting Lasers). In this connection the effect of the invention is most pronounced the higher the lasing threshold is, i.e. the more strongly the laser light source 14 has to be energized before it emits light and the more temperature-sensitive it is. This relates for available laser light sources 14 to those with visible light more strongly than those with infrared light.

The driver circuit 16 has a switch 32 by which the control circuit 30 can switch the laser current to the laser diode 14 on and off. A pulse laser current source 34 and a pre-pulse laser current source 36 are provided which are both controllable by the control circuit 30 in order to specify the shape, duration and amplitude of a pulse laser current shown by way of example in a small window 38 and of a pre-pulse laser current shown by way of example in a small window 40. As the circuit shows the pulsed laser current and the pre-pulsed laser current are simultaneously fed to the laser light source 14. It would, however, be fundamentally conceivable for these two currents to be respectively only switched on alternatively, providing an artefact arising through the switch-over can be suppressed and the pulsed laser current is selected to be correspondingly higher.

Finally, a temperature sensor 42 is connected to the control circuit 30 which measures the actual operating temperature of the laser light source 14 in order to be able to effect a temperature compensation of the pre-pulsed laser current and eventually also of the pulsed laser current. In this connection tables or computing rules for the control circuit 30 are stored which contain the required temperature adaptations of the characteristics of the pre-pulsed laser current and the pulsed laser current, with an important characteristic being the amplitude which is required for the respective temperature. The entire characteristic field plot for the laser light source 14 can also be stored from which the control 30 can derive these characteristics. With this method the desired interval (energy gap) to the lasing threshold is maintained independently of the temperature.

It is however fundamentally conceivable to take account of further environmental conditions in addition to the actual temperature in order to be able to ideally adapt the pre-pulsed current. One could for example use a counter in order to determine the working age of the laser light source 14 and to integrate a compensation for aging effects.

By means of the switch 32 and the two current sources 34, 36 the control circuit 30 can thus switch off the laser light source 14 by placing a pre-pulse laser current in a preparatory state or by controlling a pulsed laser current for the transmission of a light pulse 18.

FIG. 3 shows the plot of the laser current I as a function of time in one embodiment of the invention as generated in this way by the control circuit 30. Light pulses 18 which are schematically illustrated here as rectangles 44 with a duration $t_p$ and amplitude $I_{LP}$ are transmitted with a regular period $T_0$. If the period $T_0$ amounts for example to a microsecond, then this corresponds to a light path including the return path of approximately 150 m. Within this measurement path ambiguities are avoided by the period $T_0$.

At a time earlier by $t_-$ than the transmission time of the pulse 44 a pre-pulsed laser current is supplied to the laser light source 14 by the control circuit 30 and generates a pre-pulse 46 which continues during the pulse 44 and thereafter decays with a delay $t_+$, it thus has a duration of $t_-+t_p+t_+$. The amplitude of the pre-pulse 46 is so selected in the embodiment that it lies below the lasing threshold $I_{LT}$, approximately in the range of 70% to 90% of the lasing threshold $I_{LT}$. In this connection one endeavours to come as close as possible to the lasing threshold in order to start emitting light as quickly as possible at the start of the pulsed laser current, but not to prematurely exceed the lasing threshold. Thus larger or smaller safety margins are conceivable than the quoted range of 70% to 90%, which also depends on the fluctuations in temperature, aging and other environmental conditions. Alternative embodiments are conceivable in which the exceeding of the lasing threshold is tolerated.

The simple rectangular shape of the pre-pulse 46 is not achieved in reality but transients in the form of rising and decaying flanks are to be expected. The lead time $t_-$ and the decay time $t_+$ should be selected to be as short as possible, with the duration being above all determined in that the light pulse 44 itself is no longer effected by any transients. For this a small multiple of the pulse duration $t_p$ is normally sufficient. With an exemplary pulse width of $t_p=5$ ns a possible choice for $t_-$ and $t_+$ could be a few nano-seconds to a few tens of nanoseconds, with the decay time $t_+$ mainly being shorter than the lead time $t_-$.

The values for the maximum pulse laser current $I_{LP}$ and the lasing threshold $I_{LT}$ depends on the choice of the laser light source 14. Exemplary values for an edge emitter in the visible light range are ca. 50 mA for the lasing threshold $I_{LT}$ and ca. 200 to 300 mA for the maximum pulsed laser current $I_{LP}$.

The illustrated control of the laser light source 14 through the control circuit 30 by means of a driver circuit 16 thus knows three states, namely a rest state in which no laser current flows, a preparatory state in which the pre-pulse laser current flows as a bias current and a working state which can only be achieved via the preparatory state and in which the pulse laser current flows together with the pre-pulse laser current and with it also being possible to dispense in the working state with the bias current through a correspondingly elevated pulse laser current.

This energization ensures that the light pulse 18 always starts at a level close to the lasing threshold and it thus actually transmitted with the shortest possible delay to the control signal. Since the pre-pulse laser current is preferably below the threshold, no disturbing light arises prior to this which would be disadvantageous for the measurement and for eye protection. In total the laser light source 14 remains current-free over longer intermediate phases through the preparatory state which is restricted to a short time interval around the transmission of the light pulse 18. The laser light source can in these intermediate phases not emit any disturbing light and also does not heat up. In this way temperature effects and aging effects are reduced. Through the temperature compensation for the pre-pulse laser current any remaining fluctuations in the operating temperature are compensated.

In accordance with the invention the use of a monitoring diode is not required and is also only sensible to a restricted degree, since the pre-pulse laser current below the threshold at any event does not lead to an emission of light. In principle a monitoring diode can naturally additionally be used in order to check whether light is not already emitted during the preparatory state and optionally to subject the pre-pulse laser current to follow-up regulation in order to keep it at least only shortly above or preferably below the lasing threshold.

The invention claimed is:

1. An optoelectronic sensor, comprising:
   a light transmitter including a laser light source and configured to transmit laser pulses into a monitored region; and
   a driver circuit for the laser light source, the driver circuit configured to set the light transmitter into at least one of a working state in which the laser light source transmits a laser pulse and a preparatory state,
   wherein the driver circuit is further configured:
   to only set the light transmitter into the preparatory state prior to transmission of a laser pulse, and
   to place the laser light source to 70% to 90% of a lasing threshold, but not exceeding the lasing threshold, in the preparatory state prior to the start of the laser pulse.

2. The optoelectronic sensor in accordance with claim 1, wherein the driver circuit is configured to do at least one of bias the laser light source and supply a bias current to the laser light source in the preparatory state.

3. The optoelectronic sensor in accordance with claim 1, further comprising a control unit configured to preset characteristics of at least one of the laser pulse and the preparatory state for the driver circuit, the preset characteristics selected from the group consisting of time behaviour and amplitude behaviour.

4. The optoelectronic sensor in accordance with claim 1, wherein the driver circuit is configured to set the light transmitter in the preparatory state with a lead time of approximately one to five times the duration of the laser pulse.

5. The optoelectronic sensor in accordance with claim 1, wherein the driver circuit is configured to terminate the preparatory state for the light transmitter at the earliest at the end of the laser pulse and at the latest after one to five times the duration of the laser pulse.

6. The optoelectronic sensor in accordance with claim 1, wherein further comprising a temperature sensor configured to determine an operating temperature of the laser light source, wherein the driver circuit is configured to select an amplitude in the preparatory state in a temperature-dependent manner with reference to at least one of a table and a computing rule.

7. The optoelectronic sensor in accordance with claim 1, wherein the driver circuit is further configured to do at least one of:
   switching the laser light source to a current-free state outside of the working state and the preparatory state and,
   attaining the working state only via the preparatory state.

8. The optoelectronic sensor in accordance with claim 1, further comprising:
   a light receiver configured to receive light pulses; and
   an evaluation unit configured to calculate a range using a pulse transit time between a transmission and a reception of a light pulse.

9. The optoelectronic sensor in accordance with claim 8, further comprising a deflection unit configured to sweep sequentially transmitted light pulses over a monitoring range.

10. A method for the operation of a light transmitter in an optoelectronic sensor, comprising:
    setting the light transmitter into a preparatory state; and
    setting the light transmitter into a working state in which a laser light source transmits laser pulses into a monitored region,
    wherein:
    the light transmitter is only set into the preparatory state before the transmission of a laser pulse,
    the laser light source is set to 70% to 90% of the lasing threshold in the preparatory state up to the start of the laser pulse in the working state, and
    the laser light source does not exceed the lasing threshold prior to the start of the pulse.

11. The method in accordance with claim 10,
    wherein, in the preparatory state, the laser light source is biased or a bias current is supplied to the laser light source, and
    wherein at least one of the time behaviour and the amplitude behaviour of the laser light source is preset in at least one of the working state and the preparatory state.

12. The method in accordance with claim 10, further comprising the steps of:
    setting the light transmitter in the preparatory state with a lead time of approximately one to five times the duration of the laser pulse; and
    terminating the preparatory state for the light transmitter at the earliest at the end of the laser pulse and at the latest after one to five times the duration of the laser pulse, wherein:
    the light transmitter is only set into the working state from the preparatory state, and
    the laser light source is switched to current-free outside of the working state and the preparatory state.

13. The method in accordance with claim 10, further comprising the steps of:
    determining an operating temperature of the laser light, and
    selecting an amplitude in the preparatory state is selected in a temperature-dependent manner with reference to at least one of a table and a computing rule.

\* \* \* \* \*